US00RE42356E

(19) United States
(12) Reissued Patent
MacDonald et al.

(10) Patent Number: US RE42,356 E
(45) Date of Reissued Patent: May 10, 2011

(54) SYSTEM FOR OVERMOLDING INSERT

(75) Inventors: Jeffrey Douglas MacDonald, North York (CA); Alireza Mortazavi, Richmond Hill (CA); Robin Alexander Arnott, Alliston (CA)

(73) Assignee: Husky Injection Molding Systems Ltd., Bolton, Ontario (CA)

(21) Appl. No.: 12/204,221

(22) Filed: Sep. 25, 2008

Related U.S. Patent Documents

Reissue of:
(64) Patent No.: 7,313,459
Issued: Dec. 25, 2007
Appl. No.: 11/373,203
Filed: Mar. 13, 2006

(51) Int. Cl.
*B29C 45/00* (2006.01)

(52) U.S. Cl. ..... 700/201; 264/297.2; 425/190

(58) Field of Classification Search ..... 700/196, 700/197, 198, 200, 201; 264/297.2, 328.1; 425/190, 576
See application file for complete search history.

(56) References Cited

U.S. PATENT DOCUMENTS

| | | | |
|---|---|---|---|
| 4,330,257 | A | 5/1982 | Rees et al. |
| 5,087,404 | A | 2/1992 | Sparrow et al. |
| 5,094,601 | A | 3/1992 | Sparrow et al. |
| 5,830,404 | A | 11/1998 | Schad et al. |
| 6,634,877 | B2 | 10/2003 | Sicilia et al. |
| 2003/0077409 | A1 | 4/2003 | Schnell |
| 2006/0210746 | A1 | 9/2006 | Shi et al. |

FOREIGN PATENT DOCUMENTS

| | | | |
|---|---|---|---|
| CA | 2241509 | | 1/1999 |
| DE | 1130155 | | 5/1962 |
| DE | 19949263 | A1 | 4/2001 |
| DE | 10326768 | A1 | 1/2004 |
| EP | 0826476 | A1 | 3/1998 |
| FR | 2777497 | B1 | 5/2000 |
| JP | 2004345328 | A | 12/2004 |
| JP | 2006027138 | A | 2/2006 |
| WO | WO 2004/011315 | A2 | 2/2004 |
| WO | WO 2004/056610 | A2 | 7/2004 |

OTHER PUBLICATIONS

Doug Smock, Unique System Uses Press Motion as Punch and Die, Plastics World, Sep. 1992, p. 10.

Alpha—Multi-processing Technology, Product Brochure, published by Krauss-Maffei, Oct. 1989, pp. 1-12, published in the Federal Republic of Germany.

*Primary Examiner* — Albert Decady
*Assistant Examiner* — Chad Rapp
(74) *Attorney, Agent, or Firm* — Husky Intellectual Property Services

(57) ABSTRACT

Disclosed is a system. The system includes a mold-moving assembly that is cooperative with an insert-forming station to form an insert at least in part. The mold-moving assembly is also cooperative with an overmolding station to overmold another insert previously formed by the insert-forming station in cooperation with the mold-moving assembly. The mold-moving assembly, when so actuated, moves inserts between the insert-forming station and the overmolding station. Operation of the insert-forming station and operation of the overmolding station overlap one another at least in part.

21 Claims, 9 Drawing Sheets

SYSTEM FOR OVERMOLDING INSERT

Matter enclosed in heavy brackets [ ] appears in the original patent but forms no part of this reissue specification; matter printed in italics indicates the additions made by reissue.

TECHNICAL FIELD

The present invention generally relates to, but is not limited to, systems, and more specifically the present invention relates to, but is not limited to, a system for overmolding an insert.

BACKGROUND

WO Patent No. 2004/011315 (Inventor: Staargaard et al; Assignee: General Electric Company, USA), WO Patent No. 2004/056610 (Inventor: Staargaard; Assignee: General Electric Company, USA) and US Patent Application No. 2003/0077409 (Inventor: Schnell) all appear to disclose a process and system for inserting a hydro-formed metal insert into a mold of a molding machine, and then partially encapsulating or overmolding the formed insert with a molding material (such as a plastic resin). This approach includes using different types of machines, one type for forming and another type for molding.

European Patent Number 826,476 (Inventor: Buchholz; Assignee: Tecumseh Products Company, USA) appears to disclose loading and forming an insert (that is, a tube) in a single mold of a molding system, and then encapsulating or overmolding the insert with a molding material (such as a plastic resin). This approach includes performing the forming operation and the overmolding operation (operational steps that appears to be performed serially—one after the other) in the single mold.

An article titled Secondary Operations: Unique System Uses Press Motion As Punch and Die (published by Plastics World in September 1992, page 10) appears to disclose a molding system having a mold. With the mold opened, a press operator loads a metal insert (that is a metal buss bar) into the mold. As a press closes and clamps, a punch and die mechanism pierces a slug in the insert, and then a nylon-based molding material is injected into the mold to overmold the insert. The forming operation and the overmolding operation are performed sequentially (serially) in the same mold.

A document (dated October 1989, titled ALPHA—Multiprocessing Technology and published by Krauss Maffei of Germany), appears to disclose the ALPHA molding system that appears to be an integration of several types of molding systems (such as, for example, a compression molding system, an injection molding system and/or a gas-pressure molding system). This arrangement appears to combine different molding materials into a molded article using different processes.

German Patent Number 1,130,155 (Inventor: Voumard et al; Assignee: Regoma Company Limited) appears to disclose a process for joining or welding a tube head to a tube body. An injection mold uses a sprue channel for injection of plasticized resin. The sprue channel serves to create the tube head and it is designed as an annular passage or as a ring of closely adjacent boreholes, which feeds directly into the vicinity of a connection site that welds the tube head and the tube body in a molding chamber. The plasticized resin is fed under pressure into the channel and completely fills the space intended for the tube head so that in this manner the tube head is formed and simultaneously welded to the end of the tube body of the preform. Apparently, it is required to avoid pronounced cooling of the plasticized resin before it reaches the welding site to avoid jeopardizing secured welding of the tube body with the tube head. It appears that the tube head must be welded to a tube body so that when the tube body is manually depressed, the contents (such as toothpaste, for example) will not egress from the weld line but will egress from the opening defined in the tube head. This process appears to be a serial execution of operational steps.

SUMMARY

In a first aspect of the present invention, there is provided a system, including a mold-moving assembly cooperative with an insert-forming station to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move an insert between the insert-forming station and the overmolding station, and wherein operation of the insert-forming station and operation of the overmolding station overlap one another at least in part.

In a second aspect of the present invention, there is provided a system, including a mold half of a set of mold halves cooperative with a mold-moving assembly, the mold-moving assembly cooperative with an insert-forming station to form an insert at least in part, and mold-moving assembly cooperative with an overmolding station to overmold, at least in part, another insert previously formed by the insert-forming station in cooperation with the mold-moving assembly, wherein the mold-moving assembly is actuatable to move an insert between the insert-forming station and the overmolding station, and wherein operation of the insert-forming station and operation of the overmolding station overlap one another at least in part.

In a third aspect of the present invention, there is provided a system, including an insert-forming station cooperative with a mold-moving assembly to form an insert at least in part, the mold-moving assembly cooperative with an overmolding station to overmold, at least in part, another insert previously formed by the insert-forming station in cooperation with the mold-moving assembly, and wherein the mold-moving assembly is actuatable to move an insert between the insert-forming station and the overmolding station, and wherein operation of the insert-forming station and operation of the overmolding station overlap one another at least in part.

In a fourth aspect of the present invention, there is provided a system, including a mold half of a group of mold halves cooperative with an insert-forming station, the insert-forming station cooperative with a mold-moving assembly to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move an insert between the insert-forming station and the overmolding station, and wherein operation of the insert-forming station and operation of the overmolding station overlap one another at least in part.

In a fifth aspect of the present invention, there is provided a system, including an overmolding station cooperative with a mold-moving assembly, the mold-moving assembly cooperative with an insert-forming station to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move an insert between the insert-forming station and the overmolding station, and wherein operation of the insert-forming station and operation of the overmolding station overlap one another at least in part.

In a sixth aspect of the present invention, there is provided a system, including a mold half of a collection of mold halves cooperative with an overmolding station, the overmolding station cooperative with a mold-moving assembly, the mold-moving assembly cooperative with an insert-forming station to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move an insert between the insert-forming station and the overmolding station, and wherein operation of the insert-forming station and operation of the overmolding station overlap one another at least in part.

In a seventh aspect of the present invention, there is provided a method, including configuring a mold-moving assembly to cooperate with an insert-forming station to form an insert at least in part, cooperate with an overmolding station to overmold another insert previously formed by the insert-forming station in cooperation with the mold-moving assembly, and move inserts between the insert-forming station and the overmolding station, and configuring operation of the insert-forming station and operation of the overmolding station to overlap one another at least in part.

In a eighth aspect of the present invention, there is provided an article of manufacture for directing a data processing system to control a system operatively connectable to the data processing system, the article of manufacture including a data processing system usable medium embodying one or more instructions executable by the data processing system, the one or more instructions including instructions for directing the data processing system to direct a mold-moving assembly to cooperate with an insert-forming station to form an insert at least in part, cooperate with an overmolding station to overmold another insert previously formed by the insert-forming station in cooperation with the mold-moving assembly, and move inserts between the insert-forming station and the overmolding station, and also including instructions for directing the data processing system to direct operation of the insert-forming station and operation of the overmolding station to overlap one another at least in part.

A technical effect is, amongst other things, a reduction in cycle time for overmolding inserts with molding material (that is, operation of the insert-forming station and operation of the overmolding station overlap one another at least in part).

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

Figure 1A:
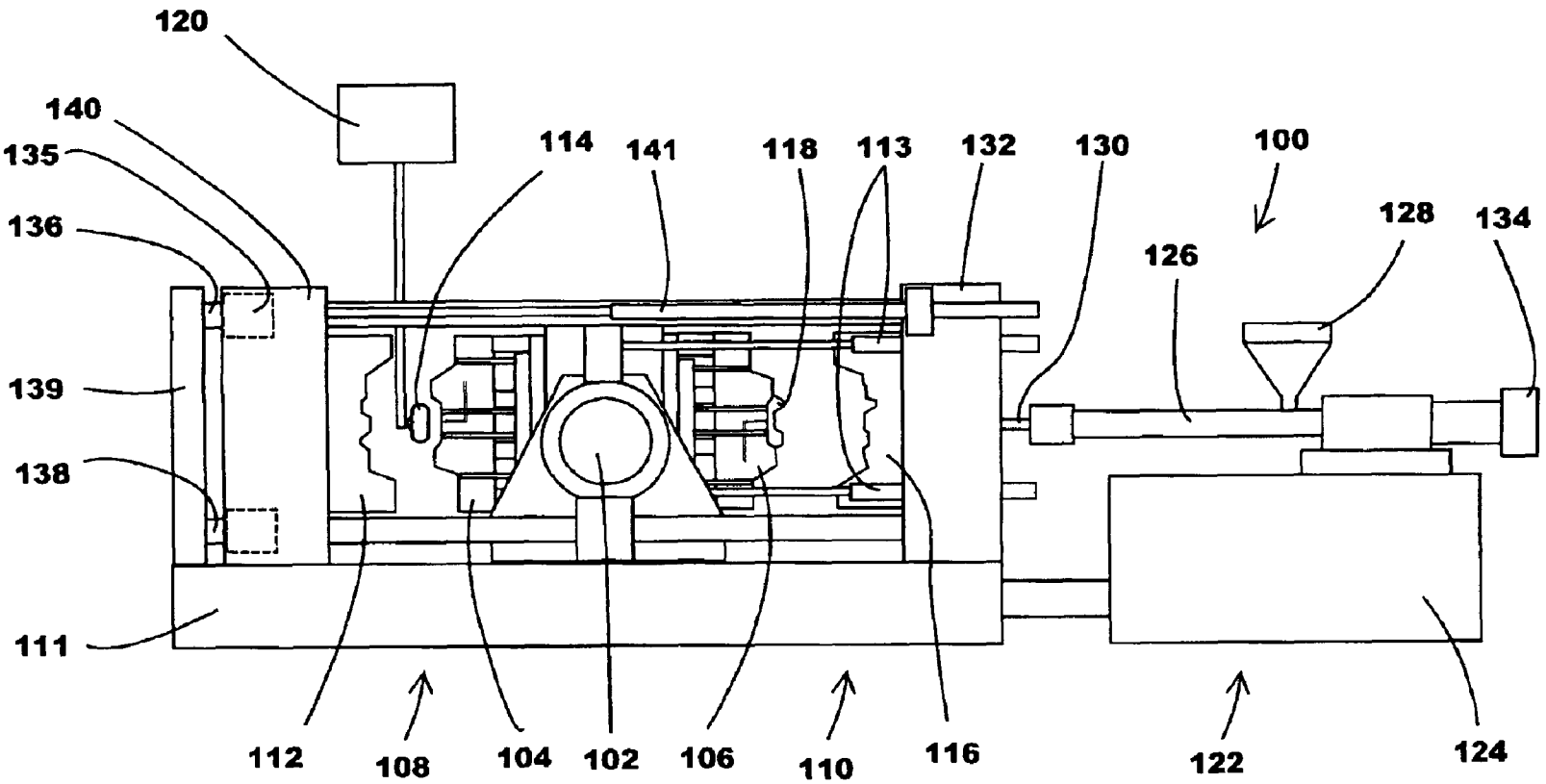
FIGS. 1A to 1E are side-elevation views of a system according to a first exemplary embodiment.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

FIGS. 1A to 1E are side-elevation views of a system 100 according to the first exemplary embodiment (which is the preferred embodiment). The elements or components of the system 100 may be supplied by different vendors in different combinations and permutations or may be supplied by a single vendor.

The system 100 includes a mold-moving assembly 102 that cooperates with an insert-forming station 108 to form an insert (at least in part) and cooperates with an overmolding station 110 to overmold the formed insert. The mold-moving assembly 102 is used to move an insert (114; 214; 514) between the insert-forming station 108 and the overmolding station 110. Operation of the insert-forming station 108 and operation of the overmolding station 110 overlap one another at least in part so that a reduction in cycle time may be achieved. Preferably, if possible, the operation of the insert-forming station 108 and operation of the molding station 110 occur simultaneously or near simultaneously (that is, overlap of operations occur concurrently) for best possible reduction in cycle time. Other technical effects are reduced floor space used by the system 100, reduced capital cost to purchase the system 100, reduced auxiliary operations, and/or improved production yield (all at least in part).

A set of mold halves (104, 106) is attached to the mold-moving assembly 102. The set of mold halves (104, 106) includes a mold half 104 and a mold half 106. The mold halves 104, 106 are depicted as a core side of a mold. The mold-moving assembly 102 moves the set of mold halves (104, 106) between the insert-forming station 108 and the overmolding station 110. The insert-forming station 108 is used to form or shape an insert 114. The insert 114 is releasably retained by the mold half 104. The overmolding station 110 is used to overmold a formed insert 118 that was previously formed by the insert-forming station 108. The formed insert 118 is releasably retained by the mold half 106.

A rotation actuator (not depicted) is included with the mold-moving assembly 102 and is actuated to cause the assembly 102 to rotate the set of mold halves (104, 106) about a horizontally-aligned rotation axis. As depicted in FIG. 1A, the mold-moving assembly 102 has rotated the mold half 104 into the insert-forming station 108 and has rotated the mold half 106 into the overmolding station 110. A pair of stroke actuators 113 is used to stroke (that is, linearly translate) the mold-moving assembly 102 toward and away from the station 110 along a base 111 that rests on a factory floor. Another pair of stroke actuators (not depicted because they are behind the actuators 113 in this view) is also used to stroke the mold-moving assembly 102 away and toward the station 110. Movement of the mold moving assembly 102 is depicted as horizontally aligned.

A group of mold halves (104, 106, 112) is used in the insert-forming station 108. The group of mold halves (104, 106, 112) includes the mold half 104, the mold half 106 and a mold half 112. The mold half 112 is depicted as the cavity side of a mold. The group of mold halves (104, 106, 112) shares at least one mold half in common with the set of mold halves (104, 106). The mold half 112 and the mold half 104 are used in the process of forming the insert 114. Preferably, the insert 114 includes a metallic hollow body, and the insert-forming station 108 is used to hydro-form the insert 114. Hydro-forming of the insert 114 may be done in a number of conventionally acceptable approaches, such as using a bladder (for example) to form the insert 114.

The insert-forming station 108 includes a movable platen 140, and the mold half 112 is attached to the movable platen 140. A platen-stroke actuator 141 is attached to the stationary platen 132 and is also attached to the movable platen 140. The actuator 141 is used to stroke (or linearly translate) the movable platen 140 along the base 111 toward and away from the mold moving assembly 102 so that the mold half 112 may be closed or opened relative to the mold half 104. Another platen-stroke actuator (not depicted because it is hidden behind the tie bar in this view) is also used to stroke the movable platen 140 toward and away from the mold moving assembly 102.

A collection of mold halves (104, 106, 116) is used in the overmolding station 110. The collection of mold halves (104, 106, 116) includes the mold half 104, the mold half 106 and a mold half 116. The mold half 116 is depicted as the cavity side of mold. The collection of mold halves (104, 106, 116) shares at least one mold half in common with the set of mold halves (104, 106). The mold half 116 and the mold half 106 are used to overmold a molding material on the formed insert 118 that is retained by the mold half 106. The formed insert 118 was previously formed in the insert-forming station 108. The overmolding station 110 includes the stationary platen 132, and the mold half 116 is attached to the stationary platen 132. The actuators 113 stroke the mold-moving assembly 102 so that the mold half 116 may be closed or opened relative to the mold half 106. The mold-moving assembly 102 is actuated to rotate the insert 114 that was formed in the insert-forming station 108 over to the overmolding station 110 so that the overmolding station 110 may subsequently overmold or encapsulate a molding material relative to the insert 114. The molding material may be overmolded relative to a gripping feature (or a surface feature) of the formed insert 118 that is retained by the mold half 106. The gripping feature may be a hole defined by the insert 118 or may be a pin or set of pins extending from the insert 118, etc. The gripping feature permits the overmolded material to better grip (and become better integrated with) the inset 118. Alternatively, the molding material frictionally engages the insert 118. It will be appreciated that the cavity and the core sides of the mold halves identified above are interchangeable.

An insert-delivery mechanism 120 delivers and places the insert 114 into the insert-forming station 108, and preferably places the insert 114 on a surface of the mold half 104. The mold half 104 retains the insert 114, and then the insert-delivery mechanism 120 retracts from the insert-forming station 108 so that the insert 114 may be formed in the station 108.

Extending between the stationary platen 132 and the movable platen 140 is a set of four tie bars 136, 138 (two of which are hidden behind tie bars 136, 138 in this view). A tie-bar support structure 139 is used to prevent the tie bars 136, 138 from sagging. The tie bars 136, 138 are fixedly attached to the stationary platen 132, extend through the movable platen 140 and over to the tie-bar support structure 139. The movable platen 140 is slidable along the tie bars 136, 138. A clamping assembly 135 is placed in the movable platen 140 and is used to apply a mold clamping force (via the tie bars 136, 138) for clamping up mold halves and to apply a mold-break force for breaking apart mold halves. The clamping assembly includes, for example, a pineapple-style clamping mechanism as known in the art. The stroke actuators 113 are used to stroke the mold-moving assembly 102 to close the mold halves 106, 116 together. The stroke actuator 141 is used to stroke the movable platen 140 toward the stationary platen 132 to close the mold halves 104, 112 together. Once the mold halves are closed together then the clamping mechanism is actuated to apply the clamping force (via the tie bars 136, 138) that acts to clamp up the closed mold halves. Once the mold halves are clamped up, the formed insert 118 is overmolded in the overmolding station 110 and the insert 114 is formed in the insert-forming station 108. Once the stations 108, 110 have completed their respective operations, the clamping assembly applies the mold break force to break apart the mold halves; then the actuators 113, 141 actuate to separate the mold halves apart from each other.

The overmolding station 110 includes an injection unit 122. The injection unit 122 includes an injection unit base 124, and includes a barrel assembly 126 that is attached to the injection unit base 124. Attached to the barrel assembly 126 is a hopper 128. The barrel assembly 126 defines an internal chamber that is sized to receive a processing screw (not depicted) that is used to process a molding material. Disposed at a tip of the barrel assembly 126 is a nozzle 130. The nozzle 130 dispenses the molding material into a sprue (not depicted) that is disposed in the stationary platen 132 and the sprue is connected to a passageway defined by the mold half 116. The sprue conveys the molding material over to a cavity defined by the mold halves 106, 116 or to a cavity defined by the mold halves 104, 116 during an injection cycle of the injection unit 122. A screw-control mechanism 134 rotates and/or translates, when actuated, the processing screw according to manufacturing criteria and/or molding material criteria. A molding material (such as, for example, a plastic resin or a magnesium alloy) is introduced into the hopper 128, which then feeds the molding material to the barrel assembly 126. The processing screw processes the molding material into a suitable state, then moves the molding material along the barrel assembly 126 toward the mold half 116. Before initiation of the injection cycle of the injection unit 122, the mold half 106 is closed and clamped up against the mold half 116. During the injection cycle, the nozzle 130 is opened and the processing screw moves to force the molding material out from the barrel assembly 126 through the opened nozzle, into the sprue, then into the mold cavity defined by the mold halves 106, 116. Since the mold half 106 retains the formed insert 118 within the mold cavity, the molding material is overmolded on the insert 118.

A technical effect of the molding system 100 is, amongst other things, a reduction of cycle time for manufacturing overmolded, formed inserts.

Figure 1B:
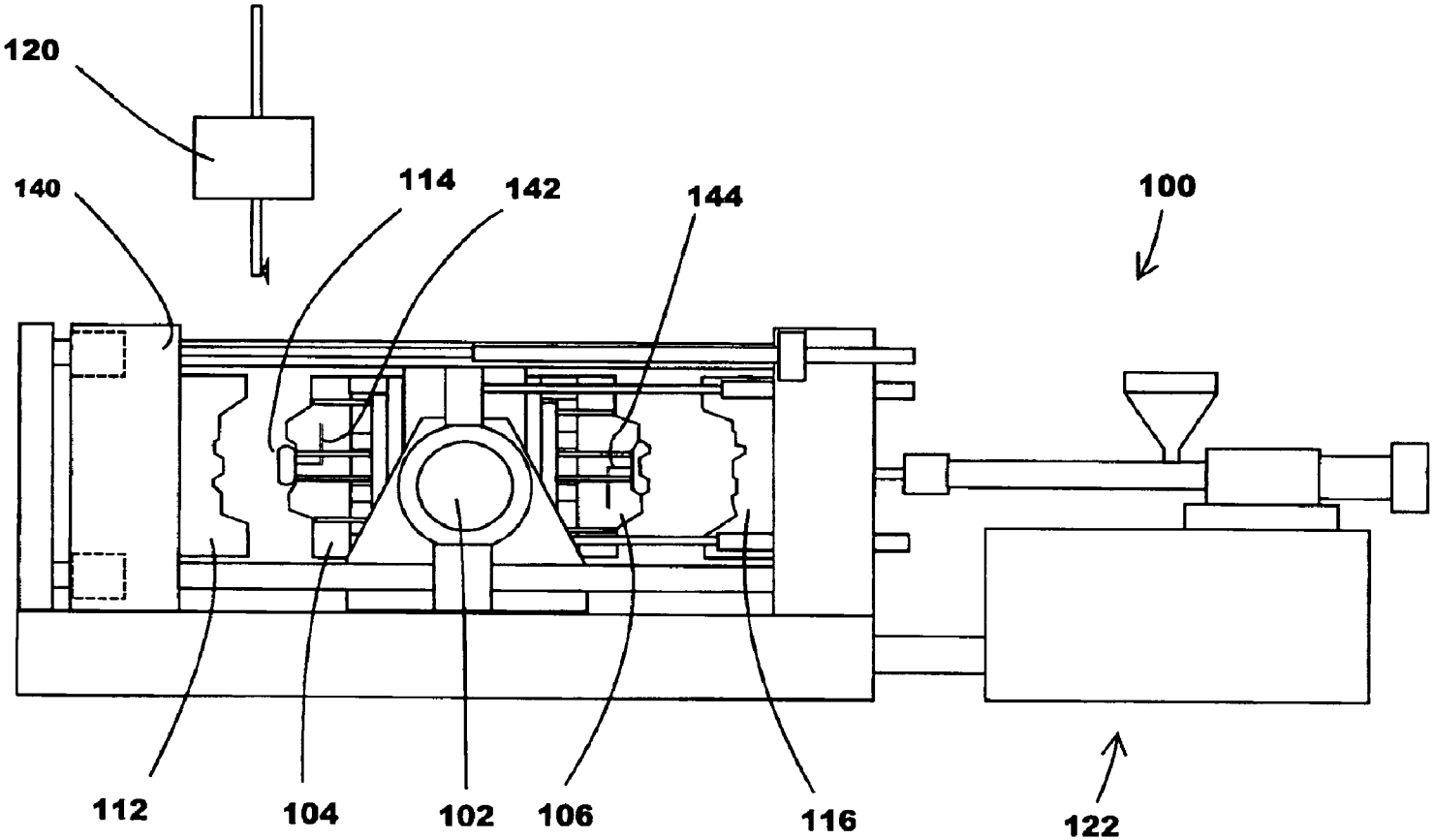

FIG. 1B depicts the insert-delivery mechanism 120 having transferred the insert 114 over to the mold half 104, and the mold half 104 retains the insert 114. The mold half 104 includes a vacuum line 142 that uses negative pressure to releasably retain or to hold the insert 114. Embodiments for releasably holding or retaining the insert 114 to the mold half 104 are depicted in FIGS. 3A to 3D.

Figure 1C:
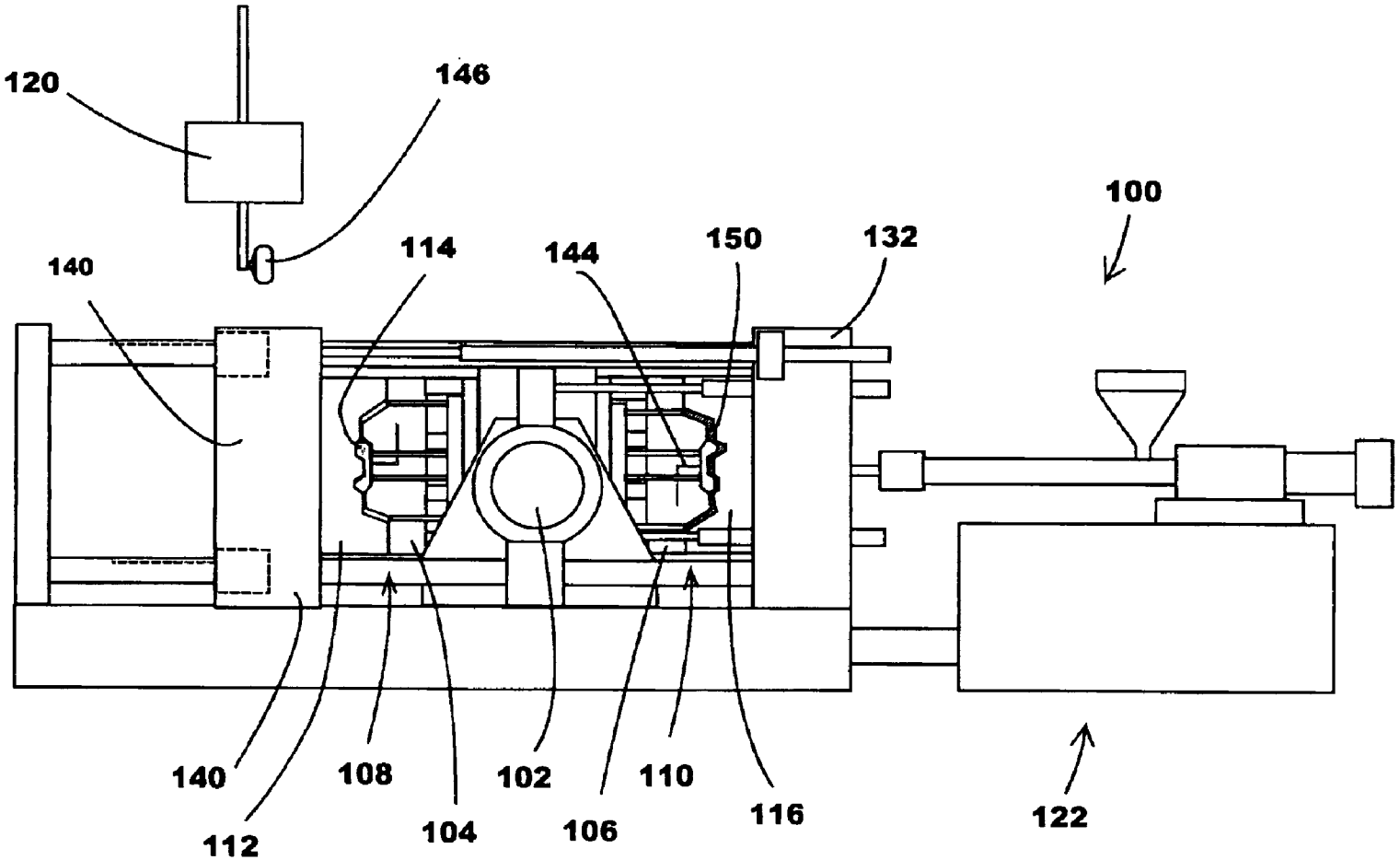

FIG. 1C depicts the moving platen 140 and the moving-mold assembly 102 actuated to move toward the stationary platen 132 so that the mold half 104 becomes closed against the mold half 112, and so that the mold half 106 becomes closed against the mold half 116. The mold halves of the mold-moving assembly 102, the insert-forming station 108 and the overmolding station 110 may be opened and closed concurrently or independently of each other. Once the mold halves 104, 112 are closed together in the insert-forming station 108, a hydro-forming process is performed on the insert 114. For example, a high-pressure fluid (such as oil, water, etc.) is injected into the hollow insert 114 with sufficient pressure so that the insert 114 becomes deformed and adopts a shape, at least in part, that is defined by the mold surfaces of the mold halves 104, 112. The hollow insert 114 may have a fluid conduit extending from the insert 114 so that the hydro-forming process may be performed. Alternatively, the insert 114 may be provided with an orifice that mates directly to a nozzle (not depicted) that extends from the mold half 104 for connection to a hydro-forming fluid supply (not depicted). Once the insert 114 is hydro-formed, the fluid may be drained from the insert 114. Fluid connections (for use in hydro-forming) to an insert are known and are not discussed here. Alternatively, the insert 114 is formed by pressing the mold halves 104, 112 together without the use of a hydro-forming fluid. According to an alternative, a non-hydro forming process is used to form or shape the insert 114, and the insert 114 may be a solid body or a hollow body.

Once the mold halves 106, 116 are closed and clamped together, a molding material is injected into a cavity that is defined by the mold halves 106, 116, and the molding material overmolds the insert 118 to form a composite article 150 (herafter called the "article" 150). Overmolding of the insert 118 may include molding a material onto and/or into the insert 118. The molding material may partially encapsulate or adhere to the insert 118 that is retained by the mold half 106. For example, a vacuum may be actuated via a vacuum line 144 for retaining the insert 118. The insert-delivery mechanism 120 is depicted positioning a new insert 146 that is ready for insertion in the station 108.

Figure 1D:
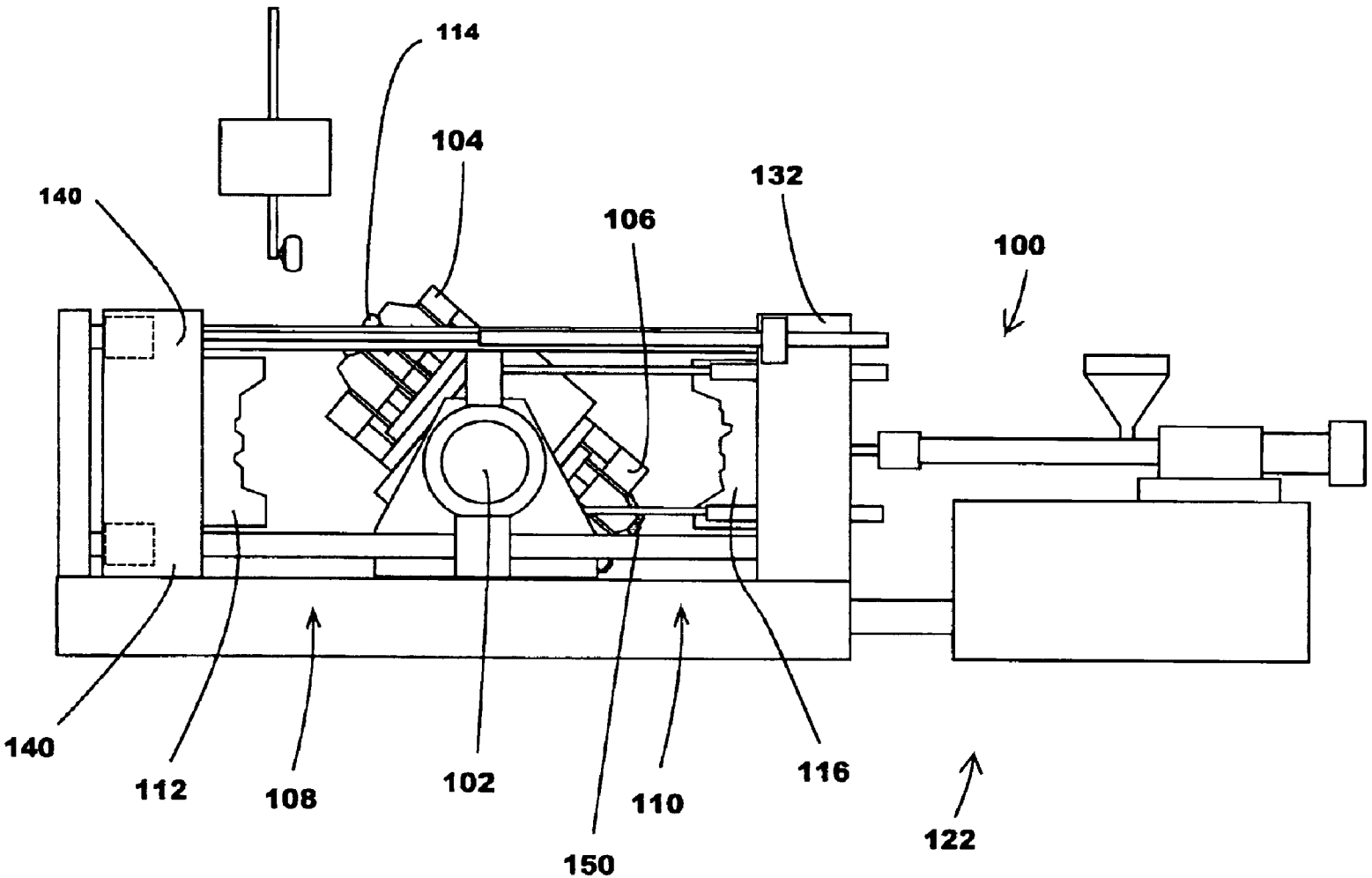

FIG. 1D depicts the moving platen 140 and the moving-mold assembly 102 moved away from the stationary platen 132 so that the mold halves 104, 112 become separated from each other, and the mold halves 106, 116 become separated from each other. Then the mold-moving assembly 102 rotates the mold halves 104, 106 one hundred and eighty degrees so that the mold half 104 and the mold half 106 are rotated to face the mold half 116 and the mold half 112 respectively. During rotation, the mold half 104 retains the insert 114 while the mold half 106 retains the article 150.

Figure 1E:
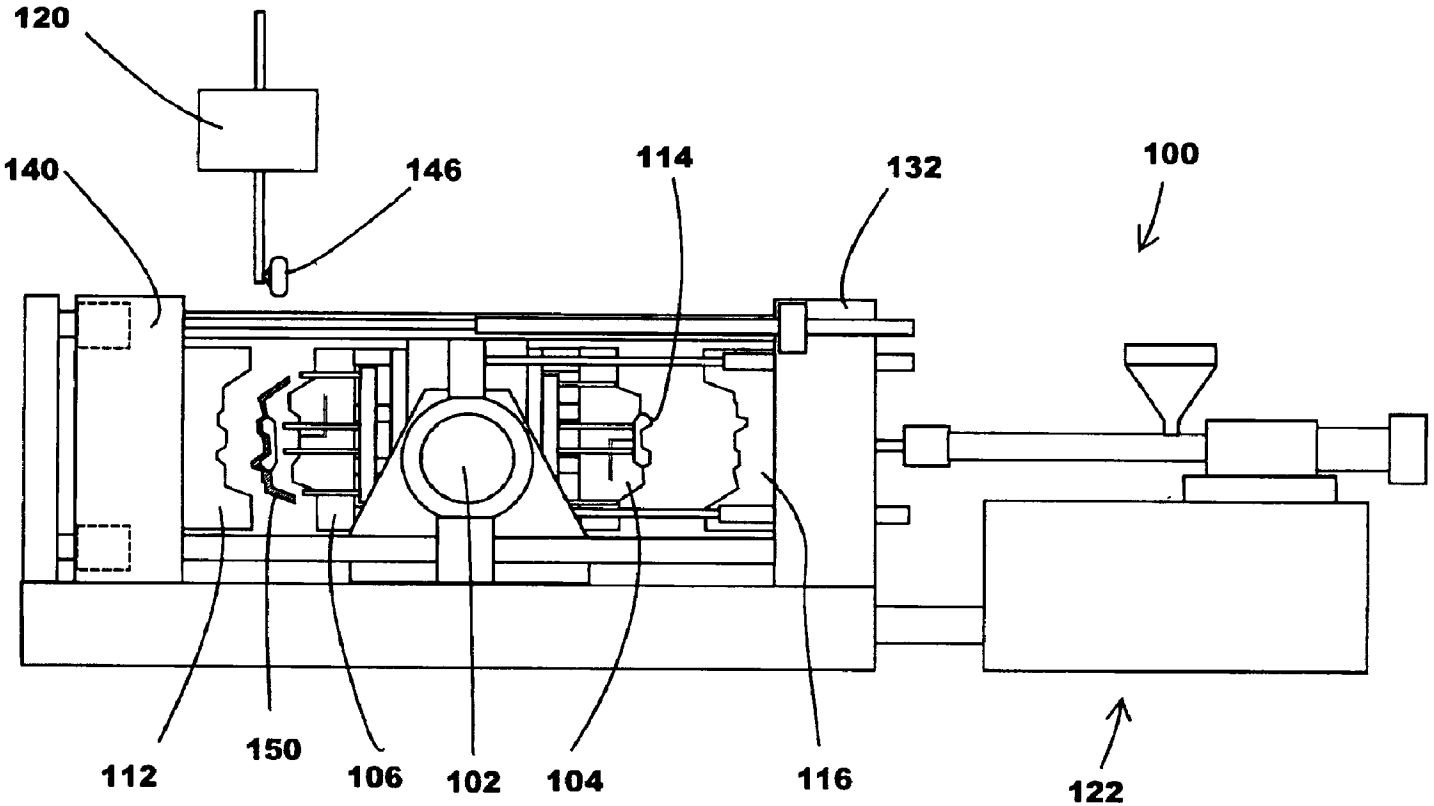

FIG. 1E depicts the mold half 104 facing the mold half 116, and depicts the mold half 106 facing the mold half 112. The article 150 is ejected from the mold half 106, and the insert-delivery mechanism 120 may place the new insert 146 onto the mold half 106. Also, the insert 114 is ready to be overmolded with a molding material. The cycle of the molding system 100 may be repeated.

Figure 2:
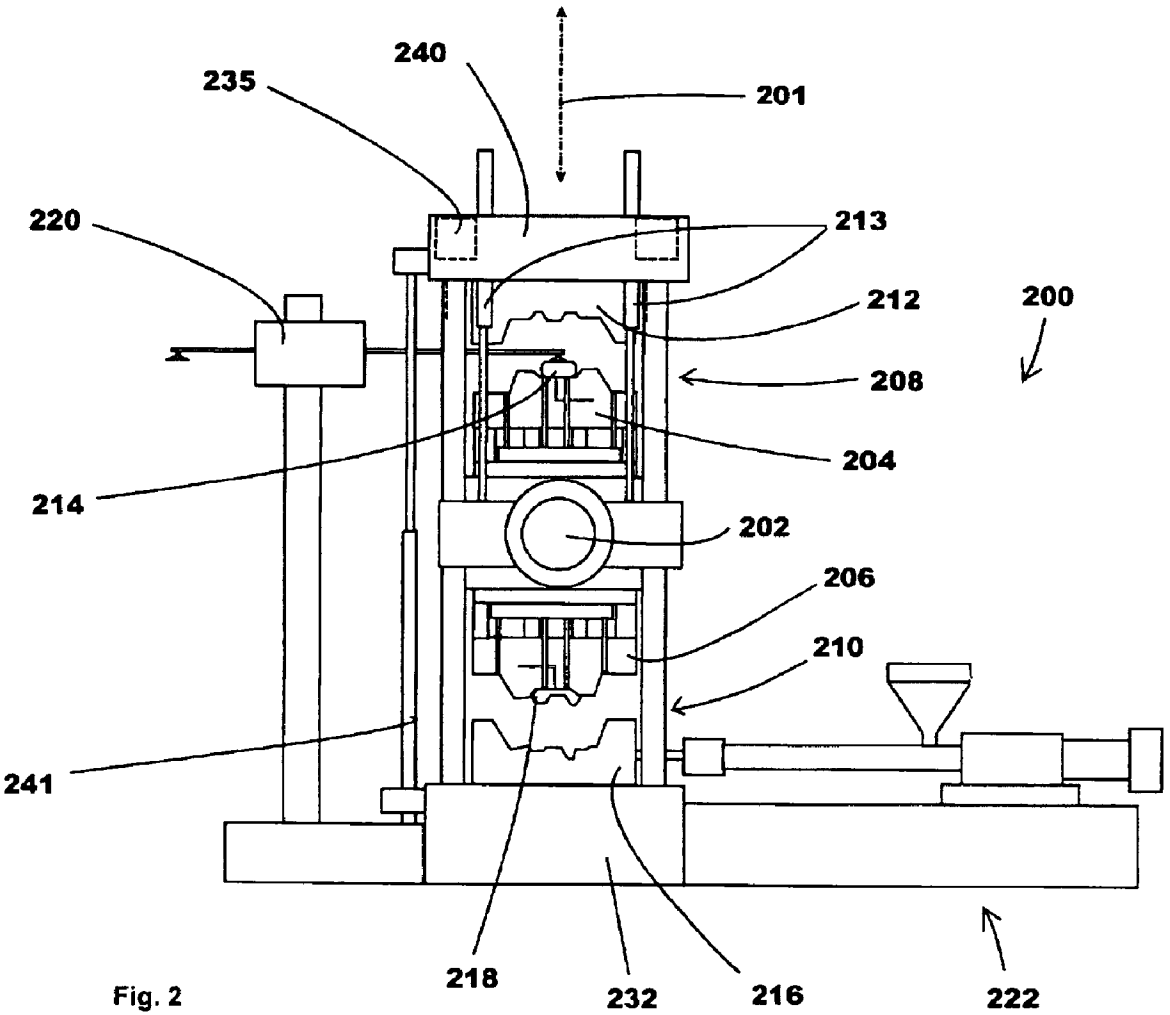
FIG. 2 is a side-elevation view of a system according to a second exemplary embodiment.

FIG. 2 is a side-elevation view of a system 200 according to the second exemplary embodiment. The elements or components of the system 200 may be supplied by different vendors in different combinations and permutations or may be supplied by a single vendor. To facilitate an understanding of the second exemplary embodiment, elements of the second embodiment (that are similar to those of the first embodiment) are identified by reference numerals that use a two-hundred designation rather than a one-hundred designation (as used in the first embodiment). For example, the mold-moving assembly 202 of the second embodiment is labeled 202 rather than being labeled 102.

The mold-moving assembly 202 translates mold halves 204, 206 along a vertically-aligned axis 201 in sharp contrast to the mold-moving assembly 102 that translates the mold halves 104, 106 along a horizontally-aligned axis. Other than that difference, the system 200 operates in a manner that is similar to that of the system 100.

FIGS. 3A to 3D are side-elevation views of the mold half 104 of the system 100 of FIG. 1A. The mold halves 104, 106 include a retaining structure 301 configured to retain or to hold, when actuated, an insert against a mold surface of a mold half. According to an alternative embodiment, the mold-moving assembly 102 includes the retaining structure.

Figures 3A, 3B, 3C, 3D:
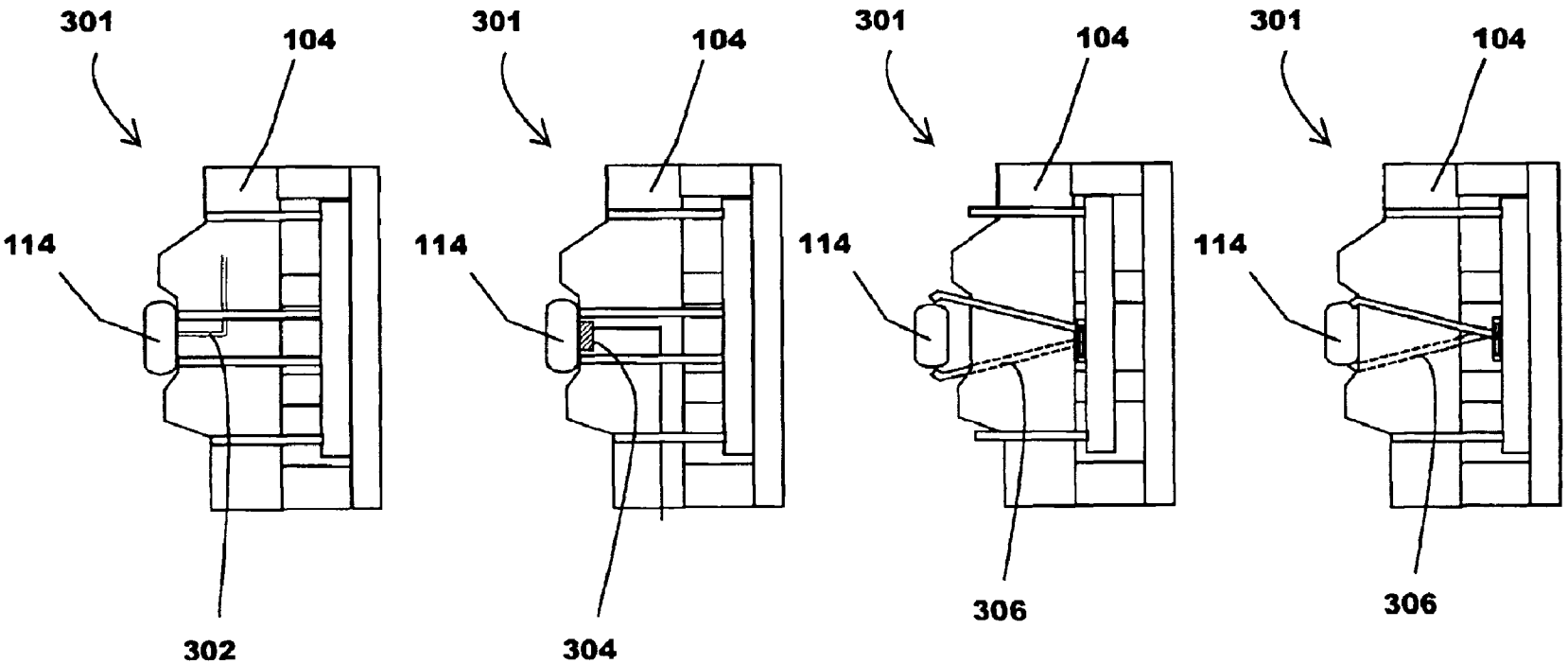
FIGS. 3A to 3D are side-elevation views of a mold used in the system of FIG. 1A or used in the system of FIG. 2A.

FIG. 3A depicts an embodiment of the mold half 104 that includes a vacuum line 302 that is adapted to retain the insert 114 against the mold half 104.

FIG. 3B depicts another embodiment of the mold half 104 that includes an electromagnet 304 that is adapted to hold the insert 114 against the mold half 104.

FIGS. 3C and 3D depict yet another embodiment of the mold half 104 that includes a mechanical gripper 306 that is adapted to grab the insert 114 and to retain the insert 114 against the mold half 104. The gripper 306 is conventional and known. FIG. 3C dhows the gripper 306 extended and FIG. 3D shows the gripper retracted.

Figure 4:
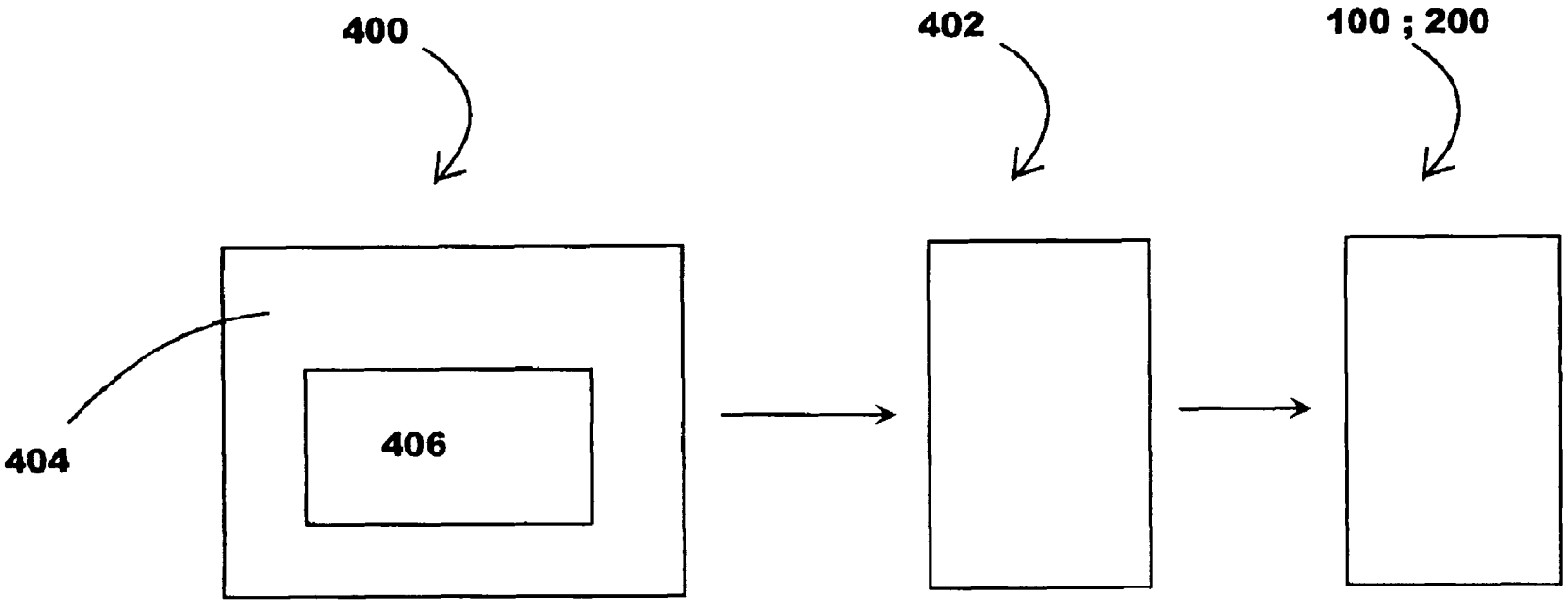
FIG. 4 shows a block schematic diagram of an article of manufacture, according to a third embodiment, the article for directing a data processing system to control the systems of FIGS. 1A and 2.

FIG. 4 shows a block schematic diagram of an article of manufacture 400, according to the third embodiment, the article 400 for directing a data processing system 402 to control the system 100, 200 of FIGS. 1A and 2 respectively. The system 100, 200 is operatively connectable to the data processing system 402. The article of manufacture 400 includes a data processing system usable medium 404 embodying one or more instructions 406 executable by the data processing system 402. The article of manufacture 400 may be a magnetic disk, an optical disk, a hard drive or RAM (Random Access Memory). The article of manufacture 400 may also be a signal that carries the one or more instructions over a network, such as the Internet, to the data processing system 402.

The one or more instructions 406 includes instructions for directing the data processing system to direct a mold-moving assembly 102, 202 to cooperate with an insert-forming station 108, 208 to form an insert, cooperate with an overmolding station 110, 210 to overmold another insert previously formed by the insert-forming station 108, 208 in cooperation with the mold-moving assembly 102, 202. The instructions also include instructions for directing the data processing system to direct operation of the mold-moving assembly 102, 202 to move an insert (114; 214; 514) between the insert-forming station 108, 208 and the overmolding station 110, 210. The instructions also include instructions for directing the data processing system to direct operation of the insert-forming station 108, 208 and operation of the overmolding station 110, 210 to overlap one another at least in part to reduce cycle time.

The one or more instructions 406 also includes, but is not limited to, the following (in no particular order):

(i) instructions for directing the data processing system to direct the insert-forming station 108, 208 to form the insert 114, 214 at least in part;

(ii) instructions for directing the data processing system to direct the overmolding station 110, 210 to encapsulate a molding material onto the insert 114, 214 at least in part;

(iii) instructions for directing the data processing system to direct the insert-forming station 108, 208 to form the insert 114, 214 at least in part onto the set of mold halves 104, 106, 204, 206;

(iv) instructions for directing the data processing system to direct the insert-forming station 108, 208 to form the insert 114, 214 at least in part, the insert-forming station 108, 208 having a group of mold halves 104, 106, 112, 204, 206, 212 configured to cooperate with the set of mold halves 104, 106, 204, 206.

(v) instructions for directing the data processing system to direct the overmolding station 110, 210 to encapsulate a molding material relative to the insert 114, 214 at least in part, the overmolding station 110, 210 cooperable with the set of mold halves 104, 106, 204, 206;

(vi) instructions for directing the data processing system to direct the overmolding station 110, 210 to overmold a molding material relative to the insert 114, 214 at least in part, the overmolding station 110, 210 having a collection of mold halves 104, 106, 116 configured to cooperate with the set of mold halves 104, 106, 204, 206;

(vii) instructions for directing the data processing system to direct the mold-moving assembly 102, 202 to rotate a set of mold halves 104, 106, 204, 206 between the insert-forming station 108, 208 and the overmolding station 110, 210;

(viii) instructions for directing the data processing system to direct the mold-moving assembly 102, 202 to linearly translate a set of mold halves 104, 106, 204, 206 between the insert-forming station 108, 208 and the overmolding station 110, 210;

(ix) instructions for directing the data processing system to direct a retaining structure 301 of the set of mold halves 104, 106, 204, 206 to releasably retain the insert; and (x) instructions for directing the data processing system to direct the insert-forming station 108, 208 to hydroform a metallic component of the insert 114, 214 at least in part.

Figure 5:
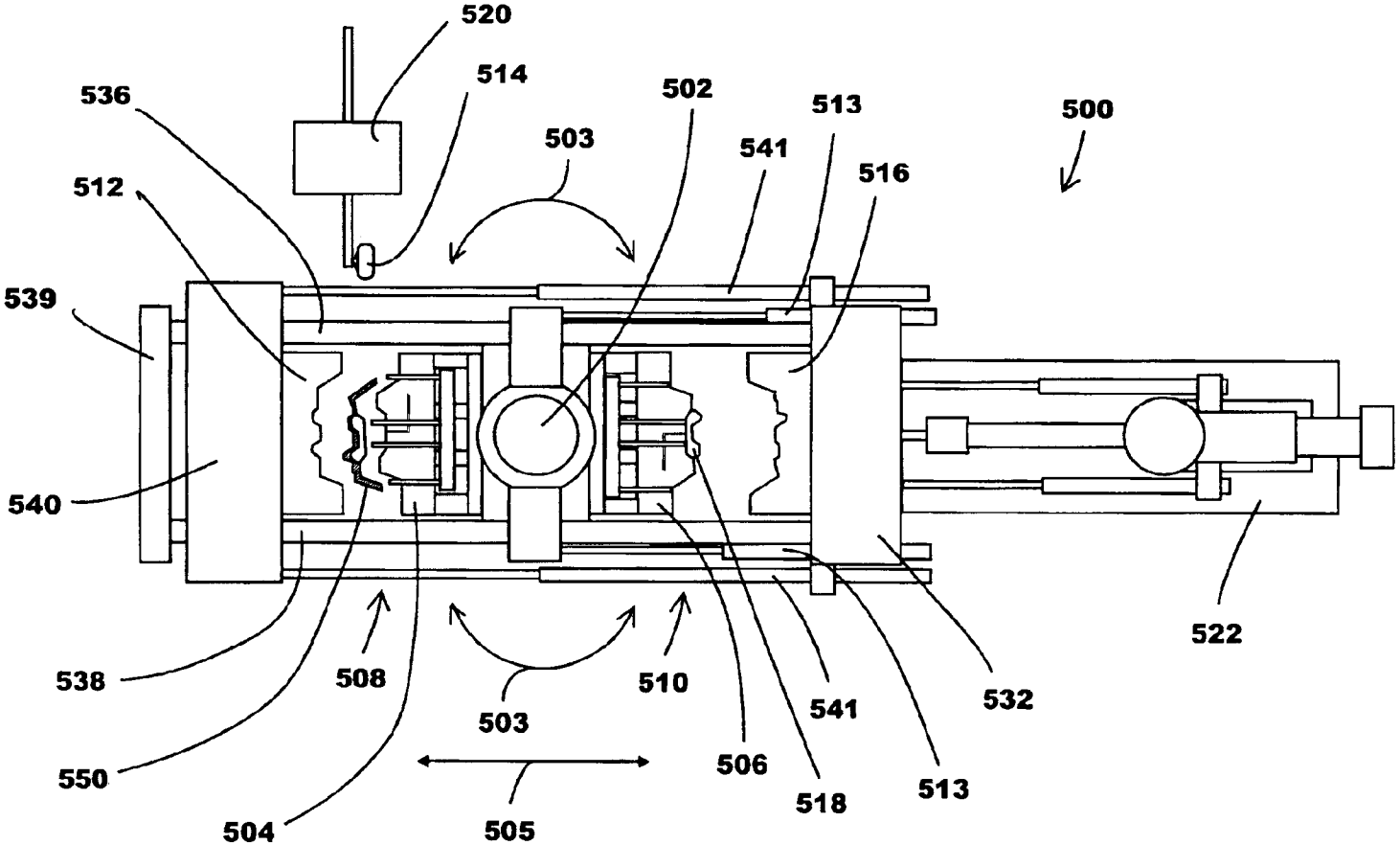
FIG. 5 is a top-elevation view (looking downwardly) of a system according to a fourth exemplary embodiment.

FIG. 5 is a top-elevation view (looking downwardly) of a system 500 according to the fourth exemplary embodiment. The elements or components of the system 500 may be supplied by different vendors in different combinations and permutations or may be supplied by a single vendor. To facilitate an understanding of the fourth exemplary embodiment, elements of the fourth embodiment (that are similar to those of the first embodiment) are identified by reference numerals that use a five-hundred designation rather than a one-hundred designation (as used in the first exemplary embodiment). For example, the mold-moving assembly 502 of the fifth exemplary embodiment is labeled 502 rather than being labeled 102, etc.

The mold-moving assembly 502 translates mold halves 504, 506 along a horizontally-aligned axis 505 (in a similar fashion to that of the system 100 of FIG. 1A). However, the mold-moving assembly 502 rotates the mold halves 504, 506 about curved arrows 503 so that the mold halves 504, 506 are rotatable about a vertically-aligned axis that extends upwardly (it extends upwardly from the surface of FIG. 5); in sharp contrast, the mold-moving assembly 102 of FIG. 1A rotates the mold halves 104, 106 along a horizontally-aligned axis that extends upwardly from the surface of FIG. 1A. Other than that difference, the system 500 operates in a manner that is similar to that of the system 100.

It will be appreciated that the retaining structure 301 of FIGS. 3A to 3D are also used with the system 500. It will be appreciated that the article of manufacture 400 of FIG. 4 is also used for controlling operation of the system 500 as well.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described.

Therefore, what is protected by way of Letters Patent are limited only by the scope of the following claims:

1. A system, comprising:

a mold-moving assembly cooperative with an insert-forming station to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move the insert between the insert-forming station and the overmolding station, and wherein operation of the insert-forming station and operation of the overmolding station overlap one another at least in part,

*the insert includes a metallic body, and*

*the insert-forming station is configured to:*

*receive the insert before the insert is formed by the insert-forming station, and*

*form the metallic body of the insert.*

2. The system of claim 1, wherein the insert-forming station is configured to form the insert at least in part, and wherein the overmolding station is configured to encapsulate a molding material onto the insert at least in part.

3. The system of claim 1, wherein the mold-moving assembly is configured to move a set of mold halves between the insert-forming station and the overmolding station, and wherein the set of mold halves is configured to cooperate with the insert-forming station to form the insert at least in part.

4. The system of claim 1, wherein the mold-moving assembly is configured to move a set of mold halves between the insert-forming station and the overmolding station, and wherein the insert-forming station includes a group of mold halves configured to cooperate with the set of mold halves to form the insert at least in part.

5. The system of claim 1, wherein the mold-moving assembly is configured to move a set of mold halves between the insert-forming station and the overmolding station, and wherein the set of mold halves is configured to cooperate with the overmolding station to encapsulate a molding material relative to the insert at least in part.

6. The system of claim 1, wherein the mold-moving assembly is configured to move a set of mold halves between the insert-forming station and the overmolding station, and wherein the overmolding station includes a collection of mold halves configured to cooperate with the set of mold halves to overmold a molding material relative to the insert at least in part.

7. The system of claim 1, wherein the mold-moving assembly is configured to rotate a set of mold halves between the insert-forming station and the overmolding station.

8. The system of claim 1, wherein the mold-moving assembly is configured to linearly translate a set of mold halves between the insert-forming station and the overmolding station.

9. The system of claim 1, wherein the mold-moving assembly is configured to move a set of mold halves between the insert-forming station and the overmolding station, and wherein the set of mold halves includes a retaining structure configured to releasably retain the insert.

10. The system of claim 1, wherein the insert includes a metallic component, and wherein the insert-forming station is configured to hydroform the metallic component of the insert at least in part.

[11. A system, comprising:

a mold half of a set of mold halves cooperative with a mold-moving assembly, the mold-moving assembly cooperative with an insert-forming station to form an insert at least in part, and the mold-moving assembly cooperative with an overmolding station to overmold, at least in part, another insert previously formed by the insert-forming station in cooperation with the mold-moving assembly, wherein the mold-moving assembly is actuatable to move the insert between the insert-forming station and the overmolding station, and wherein operation of the insert-forming station and operation of the overmolding station overlap one another at least in part.]

[12. The system of claim 11, wherein the insert-forming station is configured to form the insert at least in part, and wherein the overmolding station is configured to encapsulate a molding material onto the insert at least in part.]

[13. The system of claim 11, wherein the mold-moving assembly is configured to move the set of mold halves between the insert-forming station and the overmolding station, and wherein the set of mold halves is configured to cooperate with the insert-forming station to form the insert at least in part.]

[14. The system of claim 11, wherein the mold-moving assembly is configured to move the set of mold halves between the insert-forming station and the overmolding station, and wherein the insert-forming station includes a group of mold halves configured to cooperate with the set of mold halves to form the insert at least in part.]

[15. The system of claim 11, wherein the mold-moving assembly is configured to move the set of mold halves between the insert-forming station and the overmolding station, and wherein the set of mold halves is configured to cooperate with the overmolding station to encapsulate a molding material relative to the insert at least in part.]

[16. The system of claim 11, wherein the mold-moving assembly is configured to move the set of mold halves between the insert-forming station and the overmolding station, and wherein the overmolding station includes a collection of mold halves configured to cooperate with the set of mold halves to overmold a molding material relative to the insert at least in part.]

[17. The system of claim 11, wherein the mold-moving assembly is configured to rotate the set of mold halves between the insert-forming station and the overmolding station.]

[18. The system of claim 11, wherein the mold-moving assembly is configured to linearly translate the set of mold halves between the insert-forming station and the overmolding station.]

[19. The system of claim 11, wherein the mold-moving assembly is configured to move the set of mold halves between the insert-forming station and the overmolding station, and wherein the set of mold halves includes a retaining structure configured to releasably retain the insert.]

[20. The system of claim 11, wherein the insert includes a metallic component, and wherein the insert-forming station is configured to hydroform the metallic component of the insert at least in part.]

[21. A system, comprising:

an insert-forming station cooperative with a mold-moving assembly to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move the insert between the insert-forming station and the overmolding station, and wherein operation of the insert-forming station and operation of the overmolding station overlap one another at least in part.]

[22. The system of claim 21, wherein the insert-forming station is configured to form the insert at least in part, and wherein the overmolding station is configured to encapsulate a molding material onto the insert at least in part.]

[23. The system of claim 21, wherein the mold-moving assembly is configured to move a set of mold halves between the insert-forming station and the overmolding station, and wherein the set of mold halves is configured to cooperate with the insert-forming station to form the insert at least in part.]

[24. The system of claim 21, wherein the mold-moving assembly is configured to move a set of mold halves between the insert-forming station and the overmolding station, and wherein the insert-forming station includes a group of mold halves configured to cooperate with the set of mold halves to form the insert at least in part.]

[25. The system of claim 21, wherein the mold-moving assembly is configured to move a set of mold halves between the insert-forming station and the overmolding station, and wherein the set of mold halves is configured to cooperate with the overmolding station to encapsulate a molding material relative to the insert at least in part.]

[26. The system of claim 21, wherein the mold-moving assembly is configured to move a set of mold halves between the insert-forming station and the overmolding station, and wherein the overmolding station includes a collection of mold halves configured to cooperate with the set of mold halves to overmold a molding material relative to the insert at least in part.]

[27. The system of claim 21, wherein the mold-moving assembly is configured to rotate a set of mold halves between the insert-forming station and the overmolding station.]

[28. The system of claim 21, wherein the mold-moving assembly is configured to linearly translate a set of mold halves between the insert-forming station and the overmolding station.]

[29. The system of claim 21, wherein the mold-moving assembly is configured to move a set of mold halves between the insert-forming station and the overmolding station, and wherein the set of mold halves includes a retaining structure configured to releasably retain the insert.]

[30. The system of claim 21, wherein the insert includes a metallic component, and wherein the insert-forming station is configured to hydroform the metallic component of the insert at least in part.]

[31. A system, comprising:

a mold half of a group of mold halves cooperative with an insert-forming station, the insert-forming station cooperative with a mold-moving assembly to form an insert at least in part, the mold-moving assembly cooperative with an overmolding station to overmold, at least in part, another insert previously formed by the insert-forming station in cooperation with the mold-moving assembly, wherein the mold-moving assembly is actuatable to move the insert between the insert-forming station and the overmolding station, and wherein operation of the insert-forming station and operation of the overmolding station overlap one another at least in part.]

[32. The system of claim 31, wherein the insert-forming station is configured to form the insert at least in part, and wherein the overmolding station is configured to encapsulate a molding material onto the insert at least in part.]

[33. The system of claim 31, wherein the mold-moving assembly is configured to move a set of mold halves between the insert-forming station and the overmolding station, and wherein the set of mold halves is configured to cooperate with the insert-forming station to form the insert at least in part.]

[34. The system of claim 31, wherein the mold-moving assembly is configured to move a set of mold halves between the insert-forming station and the overmolding station, and wherein the insert-forming station includes the group of mold halves configured to cooperate with the set of mold halves to form the insert at least in part.]

[35. The system of claim 31, wherein the mold-moving assembly is configured to move a set of mold halves between the insert-forming station and the overmolding station, and wherein the set of mold halves is configured to cooperate with the overmolding station to encapsulate a molding material relative to the insert at least in part.]

[36. The system of claim 31, wherein the mold-moving assembly is configured to move a set of mold halves between the insert-forming station and the overmolding station, and wherein the overmolding station includes a collection of mold halves configured to cooperate with the set of mold halves to overmold a molding material relative to the insert at least in part.]

[37. The system of claim 31, wherein the mold-moving assembly is configured to rotate a set of mold halves between the insert-forming station and the overmolding station.]

[38. The system of claim 31, wherein the mold-moving assembly is configured to linearly translate a set of mold halves between the insert-forming station and the overmolding station.]

[39. The system of claim 31, wherein the mold-moving assembly is configured to move a set of mold halves between the insert-forming station and the overmolding station, and wherein the set of mold halves includes a retaining structure configured to releasably retain the insert.]

[40. The system of claim 31, wherein the insert includes a metallic component, and wherein the insert-forming station is configured to hydroform the metallic component of the insert at least in part.]

41. A system, comprising:

an overmolding station cooperative with a mold-moving assembly, the mold-moving assembly cooperative with an insert-forming station to form an insert at least in part, the mold-moving assembly cooperative with the overmolding station to overmold, at least in part, another insert previously formed by the insert-forming station in cooperation with the mold-moving assembly, wherein the mold-moving assembly is actuatable to move the insert between the insert-forming station and the overmolding station, and wherein operation of the insert-forming station and operation of the overmolding station overlap one another at least in part,

*the insert includes a metallic body, and*

*the insert-forming station is configured to:*

*receive the insert before the insert is formed by the insert-forming station, and*

*form the metallic body of the insert.*

42. The system of claim 41, wherein the insert-forming station is configured to form the insert at least in part, and wherein the overmolding station is configured to encapsulate a molding material onto the insert at least in part.

43. The system of claim 41, wherein the mold-moving assembly is configured to move a set of mold halves between the insert-forming station and the overmolding station, and wherein the set of mold halves is configured to cooperate with the insert-forming station to form the insert at least in part.

44. The system of claim 41, wherein the mold-moving assembly is configured to move a set of mold halves between the insert-forming station and the overmolding station, and wherein the insert-forming station includes a group of mold halves configured to cooperate with the set of mold halves to form the insert at least in part.

45. The system of claim 41, wherein the mold-moving assembly is configured to move a set of mold halves between the insert-forming station and the overmolding station, and wherein the set of mold halves is configured to cooperate with the overmolding station to encapsulate a molding material relative to the insert at least in part.

46. The system of claim 41, wherein the mold-moving assembly is configured to move a set of mold halves between the insert-forming station and the overmolding station, and wherein the overmolding station includes a collection of mold halves configured to cooperate with the set of mold halves to overmold a molding material relative to the insert at least in part.

47. The system of claim 41, wherein the mold-moving assembly is configured to rotate a set of mold halves between the insert-forming station and the overmolding station.

48. The system of claim 41, wherein the mold-moving assembly is configured to linearly translate a set of mold halves between the insert-forming station to the overmolding station.

49. The system of claim 41, wherein the mold-moving assembly is configured to move a set of mold halves between the insert-forming station and the overmolding station, and wherein the set of mold halves includes a retaining structure configured to releasably retain the insert.

50. The system of claim 41, wherein the insert includes a metallic component, and wherein the insert-forming station is configured to hydroform the metallic component of the insert at least in part.

[51. A system, comprising:

a mold half of a collection of mold halves cooperative with an overmolding station, the overmolding station cooperative with a mold-moving assembly, the mold-moving assembly cooperative with an insert-forming station to form an insert at least in part, the mold-moving assembly cooperative with the overmolding station to overmold, at least in part, another insert previously formed by the insert-forming station in cooperation with the mold-moving assembly, wherein the mold-moving assembly is actuatable to move the insert between the insert-forming station and the overmolding station, and wherein operation of the insert-forming station and operation of the overmolding station overlap one another at least in part.]

[52. The system of claim 51, wherein the insert-forming station is configured to form the insert at least in part, and wherein the overmolding station is configured to encapsulate a molding material onto the insert at least in part.]

[53. The system of claim 51, wherein the mold-moving assembly is configured to move a set of mold halves between the insert-forming station and the overmolding station, and wherein the set of mold halves is configured to cooperate with the insert-forming station to form the insert at least in part.]

[54. The system of claim 51, wherein the mold-moving assembly is configured to move a set of mold halves between the insert-forming station and the overmolding station, and wherein the insert-forming station includes a group of mold halves configured to cooperate with the set of mold halves to form the insert at least in part.]

[55. The system of claim 51, wherein the mold-moving assembly is configured to move a set of mold halves between the insert-forming station and the overmolding station, and wherein the set of mold halves is configured to cooperate with the overmolding station to encapsulate a molding material relative to the insert at least in part.]

[56. The system of claim 51, wherein the mold-moving assembly is configured to move a set of mold halves between the insert-forming station and the overmolding station, and wherein the overmolding station includes the collection of mold halves configured to cooperate with the set of mold halves to overmold a molding material relative to the insert at least in part.]

[57. The system of claim 51, wherein the mold-moving assembly is configured to rotate a set of mold halves between the insert-forming station and the overmolding station.]

[58. The system of claim 51, wherein the mold-moving assembly is configured to linearly translate a set of mold halves between the insert-forming station and the overmolding station.]

[59. The system of claim 51, wherein the mold-moving assembly is configured to move a set of mold halves between the insert-forming station and the overmolding station, and wherein the set of mold halves includes a retaining structure configured to releasably retain the insert.]

[60. The system of claim 51, wherein the insert includes a metallic component, and wherein the insert-forming station is configured to hydroform the metallic component of the insert at least in part.]

61. A method, comprising:

configuring a mold-moving assembly to:

cooperate with an insert-forming station to form an insert at least in part, *the insert includes a metallic body,* cooperate with an overmolding station to overmold, at least in part, another insert previously formed by the insert-forming station in cooperation with the mold-moving assembly, and move inserts between the insert-forming station and the overmolding station; and configuring operation of the insert-forming station and operation of the overmolding station to overlap one another at least in part, *and*

*configuring the insert-forming station to:*

*receive the insert before the insert is formed by the insert-forming station, and*

*form the metallic body of the insert.*

[62. The method of claim 61, further comprising:

configuring the insert-forming station to form the insert at least in part; and configuring the overmolding station to encapsulate a molding material onto the insert at least in part.]

[63. The method of claim 61, further comprising:

configuring the mold-moving assembly to move a set of mold halves between the insert-forming station and the overmolding station; and configuring the set of mold halves to cooperate with the insert-forming station to form the insert at least in part.]

[64. The method of claim 61, further comprising:

configuring the mold-moving assembly is configured to move a set of mold halves between the insert-forming station and the overmolding station; and configuring the insert-forming station to include a group of mold halves configured to cooperate with the set of mold halves to form the insert at least in part.]

[65. The method of claim 61, further comprising:

configuring the mold-moving assembly to move a set of mold halves between the insert-forming station and the overmolding station; and configuring the set of mold halves to cooperate with the overmolding station to encapsulate a molding material relative to the insert at least in part.]

[66. The method of claim 61, further comprising:

configuring the mold-moving assembly to move a set of mold halves between the insert-forming station and the overmolding station; and configuring the overmolding station to include a collection of mold halves configured to cooperate with the set of mold halves to overmold a molding material relative to the insert at least in part.]

[67. The method of claim 61, further comprising:

configuring the mold-moving assembly to rotate a set of mold halves between the insert-forming station and the overmolding station.]

[68. The method of claim 61, further comprising:

configuring the mold-moving assembly to linearly translate a set of mold halves between the insert-forming station and the overmolding station.]

[69. The method of claim 61, further comprising:

configuring the mold-moving assembly to move a set of mold halves between the insert-forming station and the overmolding station; and configuring the set of mold halves to include a retaining structure configured to releasably retain the insert.]

[70. The method of claim 61, further comprising:

configuring the insert to include a metallic component; and configuring the insert-forming station to hydroform the metallic component of the insert at least in part.]

[71. An article of manufacture for directing a data processing system to control a system operatively connectable to the data processing system, the article of manufacture comprising:

a data processing system usable medium embodying one or more instructions executable by the data processing system, the one or more instructions including:

instructions for directing the data processing system to direct a mold-moving assembly to:

cooperate with an insert-forming station to form an insert at least in part, cooperate with an overmolding station to overmold, at least in part, another insert previously formed by the insert-forming station in cooperation with the mold-moving assembly, and move inserts between the insert-forming station and the overmolding station; and instructions for directing the data processing system to direct operation of the insert-forming station and operation of the overmolding station to overlap one another at least in part.]

[72. The article of manufacture of claim 71, further comprising:

instructions for directing the data processing system to direct the insert-forming station to form the insert at least in part; and instructions for directing the data processing system to direct the overmolding station to encapsulate a molding material onto the insert at least in part.]

[73. The article of manufacture of claim 71, further comprising:

instructions for directing the data processing system to direct the mold-moving assembly to move a set of mold halves between the insert-forming station and the overmolding station; and instructions for directing the data processing system to direct the insert-forming station to form the insert at least in part onto the set of mold halves.]

[74. The article of manufacture of claim 71, further comprising:

instructions for directing the data processing system to direct the mold-moving assembly to move a set of mold halves between the insert-forming station and the overmolding station; and instructions for directing the data processing system to direct the insert-forming station to form the insert at least in part, the insert-forming station having a group of mold halves configured to cooperate with the set of mold halves.]

[75. The article of manufacture of claim 71, further comprising:

instructions for directing the data processing system to direct the mold-moving assembly to move a set of mold halves between the insert-forming station and the overmolding station; and instructions for directing the data processing system to direct the overmolding station to encapsulate a molding material relative to the insert at least in part, the overmolding station cooperates with the set of mold halves.]

[76. The article of manufacture of claim 71, further comprising:

instructions for directing the data processing system to direct the mold-moving assembly to move a set of mold halves between the insert-forming station and the overmolding station; and instructions for directing the data processing system to direct the overmolding station to overmold a molding material relative to the insert at least in part, the overmolding station having a collection of mold halves configured to cooperate with the set of mold halves.]

[77. The article of manufacture of claim 71, further comprising:

instructions for directing the data processing system to direct the mold-moving assembly to rotate a set of mold halves between the insert-forming station and the overmolding station.]

[78. The article of manufacture of claim 71, further comprising:

instructions for directing the data processing system to direct the mold-moving assembly to linearly translate a set of mold halves between the insert-forming station and the overmolding station.]

[79. The article of manufacture of claim 71, further comprising:

instructions for directing the data processing system to direct the mold-moving assembly to move a set of mold halves between the insert-forming station and the overmolding station; and instructions for directing the data processing system to direct a retaining structure of the set of mold halves to releasable retain the insert.]

[80. The article of manufacture of claim 71, further comprising:

instructions for directing the data processing system to direct the insert-forming station to hydroform a metallic component of the insert at least in part.]

* * * * *